US008564794B2

(12) United States Patent
Lemoine

(10) Patent No.: US 8,564,794 B2
(45) Date of Patent: Oct. 22, 2013

(54) METHOD AND APPARATUS FOR CONTINUOUS DUAL-FEED SIMPLEX IN AN IMAGE PRODUCTION DEVICE

(75) Inventor: Michel Lemoine, Grez-Doiceau (BE)

(73) Assignee: Xerox Corporation, Norwalk, CT (US)

( * ) Notice: Subject to any disclaimer, the term of this patent is extended or adjusted under 35 U.S.C. 154(b) by 716 days.

(21) Appl. No.: 12/768,118

(22) Filed: Apr. 27, 2010

(65) Prior Publication Data

US 2011/0261393 A1 Oct. 27, 2011

(51) Int. Cl.
*G06F 3/12* (2006.01)

(52) U.S. Cl.
USPC ......... 358/1.1; 358/1.17; 358/1.12; 358/1.15; 358/401; 400/82; 271/225; 347/116

(58) Field of Classification Search
None
See application file for complete search history.

(56) References Cited

U.S. PATENT DOCUMENTS 4,776,711 A 10/1988 Harada
5,859,711 A * 1/1999 Barry et al. .................. 358/296
6,168,324 B1 * 1/2001 Lever et al. ..................... 400/82
7,040,820 B2 5/2006 Perdu et al.
7,920,279 B2 * 4/2011 Ernst et al. .................. 358/1.12
2007/0164504 A1 * 7/2007 Moore .......................... 271/225

FOREIGN PATENT DOCUMENTS

EP 0798122 A3 10/1997
WO 9833652 A1 8/1998

OTHER PUBLICATIONS

Search Report for Related Application No. GB1106542.2.

* cited by examiner

*Primary Examiner* — Paul F. Payer
(74) *Attorney, Agent, or Firm* — Ronald E. Prass, Jr.; Prass LLP

(57) ABSTRACT

A method and apparatus for continuous dual-feed simplex in an image production device is disclosed. The image production device may include an image production section that includes a first media print path and a second media print path each of which produces simplex images on media, and a user interface that receives a request to print a first simplex print job and a second simplex print job, the first simplex print job being printed using the first media print path and the second simplex print job being printed using the second media print path, wherein the first simplex print job and the second simplex print job are printed at the same time.

15 Claims, 3 Drawing Sheets

METHOD AND APPARATUS FOR CONTINUOUS DUAL-FEED SIMPLEX IN AN IMAGE PRODUCTION DEVICE

BACKGROUND

Disclosed herein is a method for continuous dual-feed simplex in an image production device, as well as corresponding apparatus and computer-readable medium.

In conventional continuous feed (CF) duplex capable printer engines (made of 2 printer engines in one printer chassis), it is not possible to benefit from both internal printer engines to run two simplex applications simultaneously/in parallel. Thus, when running in simplex mode in such conventional duplex printers, the second engine is kept dormant/off which results in an inefficient use of the printer.

SUMMARY

A method and apparatus for continuous dual-feed simplex in an image production device is disclosed. The image production device may include an image production section that includes a first media print path and a second media print path each of which produces simplex images on media, and a user interface that receives a request to print a first simplex print job and a second simplex print job, the first simplex print job being printed using the first media print path and the second simplex print job being printed using the second media print path, wherein the first simplex print job and the second simplex print job are printed at the same time.

DETAILED DESCRIPTION

Figure 1:
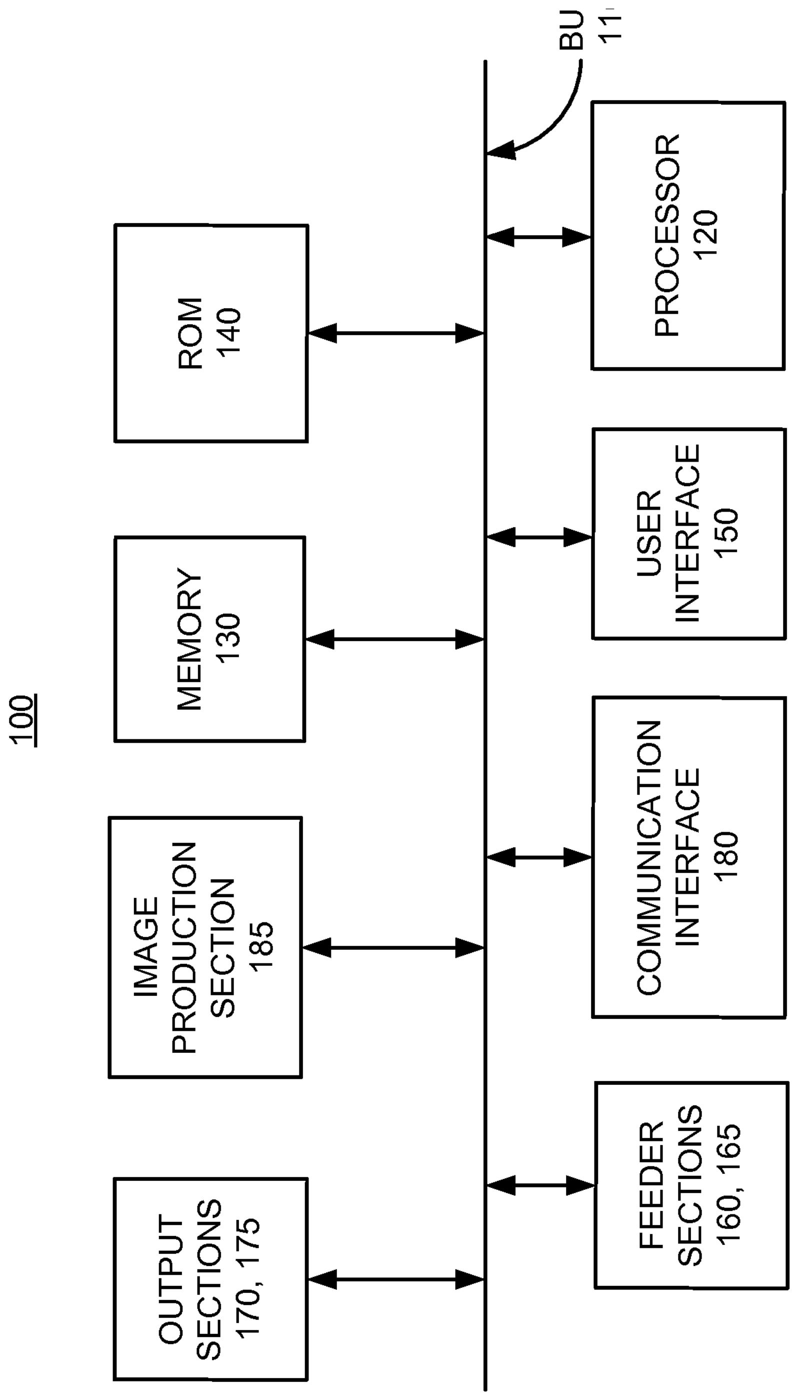
FIG. 1 is an exemplary diagram block diagram of an image production device in accordance with one possible embodiment of the disclosure.

Aspects of the embodiments disclosed herein relate to a method for continuous dual-feed simplex in an image production device, as well as corresponding apparatus and computer-readable medium.

The disclosed embodiments may include an image production device that may include an image production section that includes a first media print path and a second media print path each of which produces simplex images on media, and a user interface that receives a request to print a first simplex print job and a second simplex print job, the first simplex print job being printed using the first media print path and the second simplex print job being printed using the second media print path, wherein the first simplex print job and the second simplex print job are printed at the same time.

The disclosed embodiments may further include a method for continuous dual-feed simplex in an image production device. The method may include receiving a request to print a first simplex print job at a user interface, printing the first simplex print job on a first media print path, receiving a request to print a second simplex print job at the user interface, and printing the second simplex print job on a second media print path, wherein the first simplex print job and the second simplex print job are printed at the same time.

The disclosed embodiments may further include an image production section of an image production device that may include a first media print path which produces simplex images on media, and a second media print path each of which produces simplex images on media, wherein the first media print path includes a first imager and a first printer engine and the second media print path includes a second imager and a second printer engine, wherein a request to print a first simplex print job and a second simplex print job are received by a user interface, the first simplex print job being printed using the first media print path and the second simplex print job being printed using the second media print path, and the first simplex print job and the second simplex print job are printed at the same time.

The disclosed embodiments may concern providing a second paper path input and a second paper path output as to enable two simplex independent applications to run in parallel inside the same image production device, taking benefit of the existing second printer engine being needed and used when printing in duplex. When the image production device is running in duplex, only one of the inputs/outputs may be used. Note that single or multiple user interfaces may be used to show independent statuses for both media printing paths and be used to control the operation of each path.

The dual simplex mode may enable two independent media printing paths with their associated printer engines, as follows:

Media Printing path 1: Delivered by its dedicated preprocessor and feeder equipment, the media (e.g., paper, cardstock, etc.) may enter the image production device through a dedicated first input section (or feeder section), moves in front of a first imager where a first image is transferred, then moves to a printer engine (hardware that places markings on the media) where the first image is fused or transferred, then may exit the image production device through a dedicated output section to finally move to its own finishing area.

Media Printing path 2: Delivered by its dedicated preprocessor and feeder equipment, the media may enter the image production device through a dedicated second input section (or feeder section), moves in front of a second imager where a second image is transferred, then moves to a printer engine (hardware that places markings on the media) where the second image is fused or transferred, then may exit the image production device through a dedicated output section to finally move to its own finishing area.

The duplex media printing path may involve moving the media from the first input section into the front of a first imager as to get the backside of the first image transferred on one side of the media, then in front of the second imager to transfer the front side image on the other side of the media. The imaged duplex media pages may then after moved in front of the second printer engine and then in front of the firstprint engine. Finally, the media may be output to the post-processing or finishing area through the first output section.

The additional paper path may provide users/equipment owners with the benefit of getting a more use out of their investment in the image production device.

FIG. 1 is an exemplary block diagram of the image production device 100 in accordance with one possible embodiment of the disclosure. The image production device 100 may be any device that may be capable of making image production documents (e.g., printed documents, copies, etc.) including a copier, a printer, a facsimile device, and a multi-function device (MFD), for example. The image production device 100 may include a bus 110, a processor 120, a memory 130, a read only memory (ROM) 140, the user interface 150, input feeder sections 160, 165, an image production section 185, output sections 170, 175, and a communication interface 180. Bus 110 may permit communication among the components of the image production device 100.

The image production section 185 may include hardware by which image signals are used to create a desired image. The stand-alone input feeder sections 160, 165 may store and dispense media sheets on which images are to be printed using individual sheets or media rolls, for example. The output sections 170, 175 may include hardware for stacking, folding, stapling, binding, etc., prints which are output from the image production section. If the image production device 100 is also operable as a copier, the image production device 100 may further includes a document feeder and scanner which may operate to convert signals from light reflected from original hard-copy image into digital signals, which are in turn processed to create copies with the image production section 185.

With reference to feeder sections 160, 165 the section may include one or more media trays or media rolls, each of which stores a media stack or print sheets ("media") of a predetermined type (size, weight, color, coating, transparency, etc.) and may include a feeder to dispense one of the media sheets therein as instructed. The media trays may be accessed by a user by opening the one or more media tray doors 110. One or more media tray door sensors may sense if one or more media tray door is either open or closed. The one or more media tray door sensors may be any sensors known to one of skill in the art, such as contact, infra-red, magnetic, or light-emitting diode (LED) sensors, for example. The one or more media tray size sensors may be any sensors that may detect media size in a media known to one of skill in the art, including switches, etc.

Certain types of media may require special handling in order to be dispensed properly. For example, heavier or larger media may desirably be drawn from a media stack by use of an air knife, fluffer, vacuum grip or other application (not shown in the Figure) of air pressure toward the top sheet or sheets in a media stack. Certain types of coated media may be advantageously drawn from a media stack by the use of an application of heat, such as by a stream of hot air (not shown in the Figure). Sheets of media drawn from a media stack on a selected media tray may then be moved to the image production section 185 to receive one or more images thereon. Then, the printed sheet is then moved to output section 170, 175 where it may be collated, stapled, folded, punched, etc., with other media sheets in manners familiar in the art.

Processor 120 may include at least one conventional processor or microprocessor that interprets and executes instructions. Memory 130 may be a random access memory (RAM) or another type of dynamic storage device that stores information and instructions for execution by processor 120. Memory 130 may also include a read-only memory (ROM) which may include a conventional ROM device or another type of static storage device that stores static information and instructions for processor 120.

Communication interface 180 may include any mechanism that facilitates communication via a network. For example, communication interface 180 may include a modem. Alternatively, communication interface 180 may include other mechanisms for assisting in communications with other devices and/or systems.

ROM 140 may include a conventional ROM device or another type of static storage device that stores static information and instructions for processor 120. A storage device may augment the ROM and may include any type of storage media, such as, for example, magnetic or optical recording media and its corresponding drive.

The user interface 150 may contain one or more display screen (which may be a touchscreen or simply a display, for example), and a number of buttons, knobs, switches, etc. to be used by a user to control image production device 100 operations. The one or more display screen may also display warnings, alerts, instructions, and information to a user. While the user interface 150 may accept user inputs, another source of image data and instructions may include inputs from any number of computers to which the printer is connected via a network, for example.

Output section 170, 175 may include one or more conventional mechanisms that output image production documents to the user, including output trays, output paths, finishing section, etc., for example. The image production section 185 may include an image printing and/or copying section, a scanner, a fuser, etc., for example. Scanner 190 may an automatic document feeder scanner, platen scanner, or any other scanner known to one of skill in the art that may be able to record and process image data.

The image production device 100 may perform such functions in response to processor 120 by executing sequences of instructions contained in a computer-readable medium, such as, for example, memory 130. Such instructions may be read into memory 130 from another computer-readable medium, such as a storage device or from a separate device via communication interface 180.

The image production device 100 illustrated in FIG. 1 and the related discussion are intended to provide a brief, general description of a suitable communication and processing environment in which the disclosure may be implemented. Although not required, the disclosure will be described, at least in part, in the general context of computer-executable instructions, such as program modules, being executed by the image production device 100, such as a communication server, communications switch, communications router, or general purpose computer, for example.

Generally, program modules include routine programs, objects, components, data structures, etc. that perform particular tasks or implement particular abstract data types. Moreover, those skilled in the art will appreciate that other embodiments of the disclosure may be practiced in communication network environments with many types of communication equipment and computer system configurations, including personal computers, hand-held devices, multi-processor systems, microprocessor-based or programmable consumer electronics, and the like that are capable of displaying the print release marking and can be scanned by the image production device 100.

Figure 2A:
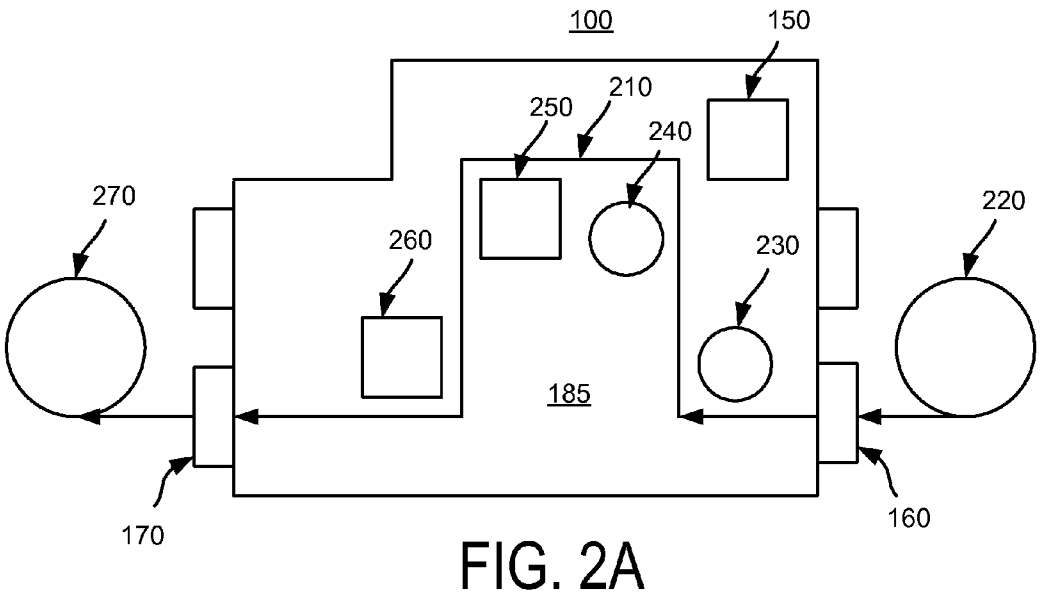
FIGS. 2A and 2B are exemplary diagrams of image production devices in accordance with one possible embodiment of the disclosure.
Figure 2B:
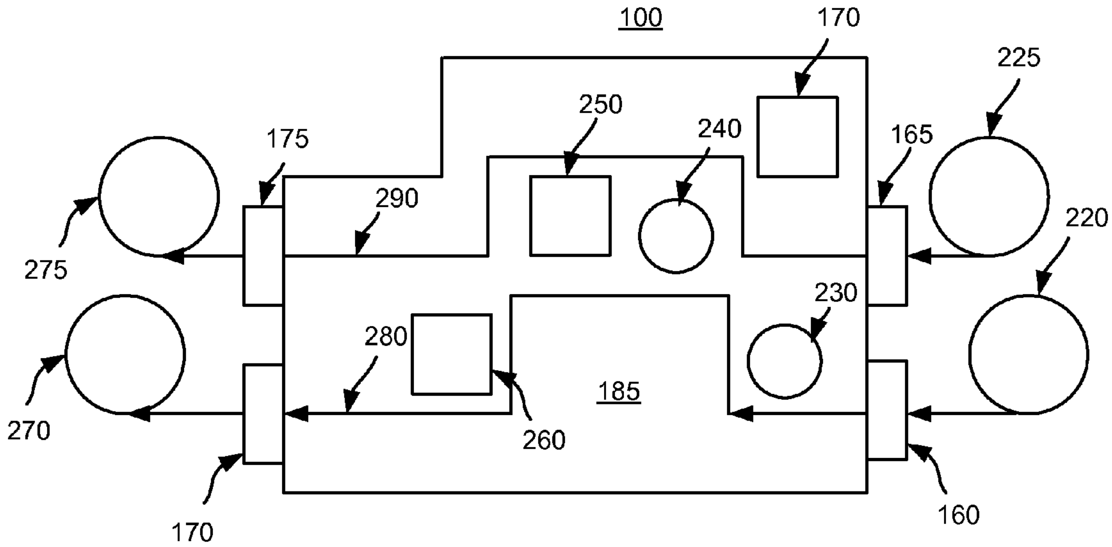

FIGS. 2A and 2B are exemplary diagrams of operating modes of the image production device 100 in accordance with one possible embodiment of the disclosure. FIG. 2A shows a duplex media printing path 210 of the image production device 100 that may use both imagers 230, 240 and both printer engines 250, 260. The imagers 230, 240 may represent any arrangement of software and hardware suitable for converting image data in a first format into a second format more directly operative of image hardware for creating the desired image, such as compressed binary. The imaging hardware may include a Raster-Output Scanner (ROS) or Light-Emitting Diode (LED) bar, suitable for selectably imagewise charging or discharging the surface of a photoreceptor to create an electrostatic latent image suitable for development and transfer, according to the basic principles of xerography.

The printer engines 250, 260 may represent an arrangement of hardware suitable for placing marks on a sheet according to a desired image manifest in digital data. In a xerographic print engine, there may be included at least one photoreceptor or other charge receptor, in the form of a drum or belt, and hardware for transferring marking material from the photoreceptor to the sheet or web. In a color xerographic engine, a plurality of photoreceptors may be arranged with a common intermediate member, such as belt, on which to build up successive primary-color partial images to form a color image that is transferred to the sheet or web.

The first imager 230 may be located on the lower portion of the image production section 185. The second imager 240 may be located above the first imager 230 and toward the output-side of the image production section 185. The second printer engine 250 may be located adjacent to the second imager 240 and toward the output-side of the image production section 185. The first printer engine 260 may be below the first imager 230 and toward the output-side of the image production section 185. The locations of the first and second imagers 230, 240 and the first and second printer engines 250, 260 enable printing of both duplex media and dual-simplex media.

In the duplex process, the media may be moved from the unwind media roll 220 to the first input feeder section 160 into the front of a first imager 230 as to get the backside of the first image transferred on one side of the media, then in front of the second imager 240 to transfer the second image on the other side of the media. The imaged duplex media pages may then be moved in front of the second printer engine 250 and then in front of the first printer engine 260. Finally, the media may be output to the post-processing or finishing area through the first output section 170 to the rewind roll 270.

The first imager 230 may image the sheet or the web when it is travelling in the upwards position at a 9 o'clock (or 270 degree) position, the second imager 240 may image the sheet or the web when it is travelling in the upwards position at a 3 o'clock (or 90 degree) position, the second printer engine 250 may place the markings on the media when it is travelling sideways at a 12 o'clock (or zero degree) position, and then the first printer engine 260 may place the markings on the media when it is travelling sideways at a 12 o'clock (or zero degree) position on the duplex (or third) media print path 210.

FIG. 2B shows the dual simplex printing mode that may enable two independent media printing paths 280, 290 with their associated printer engines 260, 250. With respect to the first media path 280, the media may enter the image production device 100 from the first unwind media roll 220 through a dedicated first input section 160 and may move in front of the first imager 230 where a first image may be transferred, then moves to a printer engine 260 where the first image is fused or transferred, then may exit the image production device 100 through a dedicated first output section 170 to finally move to its own finishing area and the rewind media roll 270. As shown, the first media print path 280 may have a first sideways section coming from the first input section 170 where the media travels sideways, an upward section where the media travels upward, a second sideways section where the media travels sideways, a downward section where the media travels downward, and a third sideways section where the media travels sideways to the first output section 160. The first imager 230 may image the sheet or the web when it is travelling in the upwards position at a 9 o'clock (or 270 degree) position on the first media print path 280, and then the first printer engine 260 may place the markings on the media when it is travelling sideways at a 12 o'clock (or zero degree) position on the first media print path 280.

With respect to the second media path 290, the media may enter the image production device 100 from the unwind media roll 225 through a dedicated second input section 165, moves in front of a second imager 240 where a second image is transferred, then moves to a printer engine 250 where the second image is fused or transferred, then may exit the image production device 100 through a dedicated output section 175 to finally move to its own finishing area and the rewind media roll 275. As shown, the second media print path 290 may have a first sideways section coming from the second input section 175 where the media travels sideways, an upward section where the media travels upward, a second sideways section where the media travels sideways, a downward section where the media travels downward, and a third sideways section where the media travels sideways to the second output section 165. The second imager 240 may image the sheet or the web when it is travelling in the upwards position at a 3 o'clock (or 90 degree) position on the second media print path 290, and then the second printer engine 250 may place the markings on the media when it is travelling sideways at a 12 o'clock (or zero degree) position on the second media print path 290.

Note that the positions of the first imager 230 and second imager 240 may be shifted such that the first imager images at a 3 o'clock (or 90 degree) position on the first media print path 280 and the second imager 240 images at a 9 o'clock (or 270 degree) position on the second media print path 290, for example.

The operation of components of the image production device 100 and the continuous dual-feed simplex process will be discussed in relation to the flowchart in FIG. 3.

Figure 3:
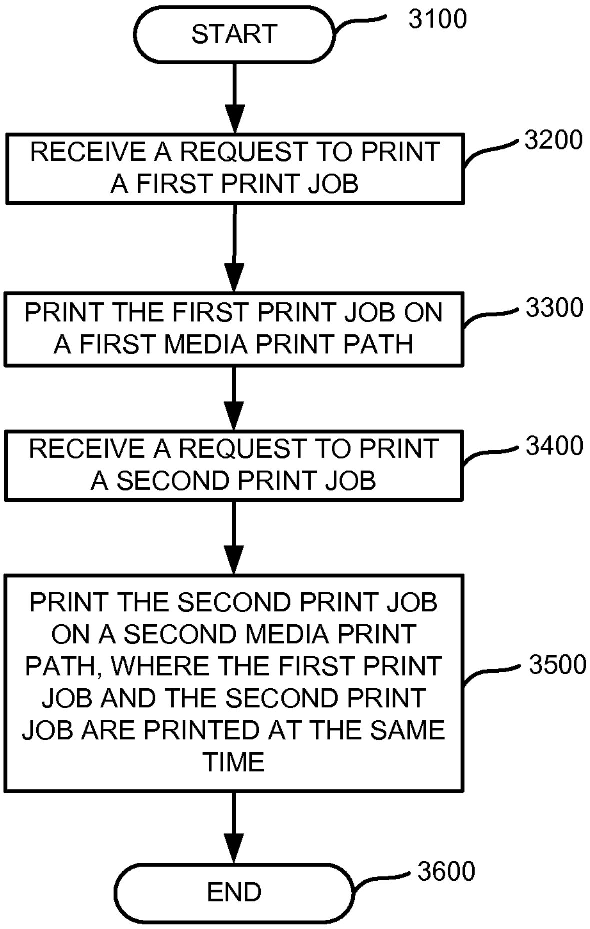
FIG. 3 is a flowchart of an exemplary continuous dual-feed simplex process in accordance with one possible embodiment of the disclosure.

FIG. 3 is a flowchart of a possible continuous dual-feed simplex process in accordance with one possible embodiment of the disclosure. The method may begin at step 3100, and may continue to step 3200 where the user interface 150 may receive a request to print a first simplex print job. At step 3300, the image production section 185 may print the first simplex print job on a first media print path 280. At step 3400, the user interface 150 may receive a request to print a second simplex print job. At step 3500, the image production section 185 may print the second simplex print job on a second media print path 290, where the first simplex print job and the second simplex print job may be printed at the same time. The first media print path 280 may include a first imager and a first printer engine and the second media print path 290 may include a second imager and a second printer engine. The process may then go to step 3600 and end.

Note that the user interface 150 may receive a request to print a duplex print job. The image production section 185 may then print the duplex print job on a third media print path 210. The third media print path 210 may contain portions of the first media print path 280 and the second media print path 290.

Embodiments as disclosed herein may also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures. When information is transferred or provided over a network or another communications connection (either hardwired, wireless, or combination thereof) to a computer, the computer properly views the connection as a computer-read-able medium. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, objects, components, and data structures, and the like that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described therein.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. An image production device, comprising:

an image production section that includes a first media print path and a second media print path each of which produces simplex images on media; and a user interface that receives a request to print a first simplex print job and a second simplex print job, the first simplex print job being printed using the first media print path and the second simplex print job being printed using the second media print path, wherein the first simplex print job and the second simplex print job are printed at the same time, wherein the first media print path and the second media print path each have a first sideways section where the media travels sideways, an upward section where the media travels upward, a second sideways section where the media travels sideways, a downward section where the media travels downward, and a third sideways section where the media travels sideways, wherein the first media print path includes a first imager and a first printer engine and the second media print path includes a second imager and a second printer engine, wherein the first imager transfers the image to one of media and a web in the upward section of the first media print path and the first printer engine places markings on the media on the third sideways section of the first media print path, and the second imager transfers the image to one of media and a web in the upward section of the second media print path and the second printer engine places markings on the media on the second sideways section of the first media print path.

2. The image production device of claim 1, further comprising:

a feeder section that feeds media to produce images on the media having a first input and a second input, the first input feeding media to the first media print path and the second input feeding media to the second media print path; and an output section that feeds media to produce images on the media having a first output and a second output, the first output outputting media from the first media print path and the second output outputting media from the second media print path.

3. The image production device of claim 1, further comprising:

a third media print path which produces duplex images on media, wherein the user interface receives a request to print a duplex print job, and the image production section prints the duplex print job on the third media print path.

4. The image production device of claim 3, wherein the third media print path contains portions of the first media print path and the second media print path.

5. The image production device of claim 1, wherein the image production device is one of a copier, a printer, a facsimile device, and a multi-function device.

6. A method for continuous dual-feed simplex in an image production device, comprising:

receiving a request to print a first simplex print job at a user interface;

printing the first simplex print job on a first media print path;

receiving a request to print a second simplex print job at the user interface; and printing the second simplex print job on a second media print path, wherein the first simplex print job and the second simplex print job are printed at the same time, wherein the first media print path and the second media print path each have a first sideways section where the media travels sideways, an upward section where the media travels upward, a second sideways section where the media travels sideways, a downward section where the media travels downward, and a third sideways section where the media travels sideways, wherein the first media print path includes a first imager and a first printer engine and the second media print path includes a second imager and a second printer engine, wherein the first imager transfers the image to one of media and a web in the upward section of the first media print path and the first printer engine places markings on the media on the third sideways section of the first media print path, and the second imager transfers the image to one of media and a web in the upward section of the second media print path and the second printer engine places markings on the media on the second sideways section of the first media print path.

7. The method of claim 6, wherein the first media print path and the second media print path have separate inputs separate outputs.

8. The method of claim 6, further comprising:

receiving a request to print a duplex print job; and printing the duplex print job on a third media print path.

9. The method of claim 8, wherein the third media print path contains portions of the first media print path and the second media print path.

10. The method of claim 6, wherein the image production device is one of a copier, a printer, a facsimile device, and a multi-function device.

11. An image production section of an image production device, comprising:

a first media print path which produces simplex images on media; and a second media print path each of which produces simplex images on media, wherein the first media print path includes a first imager and a first printer engine and the second media print path includes a second imager and a second printer engine, wherein a request to print a first simplex print job and a second simplex print job are received by a user interface, the first simplex print job being printed using the first media print path and the second simplex print job being printed using the second media print path, and the first simplex print job and the second simplex print job are printed at the same time, wherein the first media print path and the second media print path each have a first sideways section where the media travels sideways, an upward section where the media travels upward, a second sideways section where the media travels sideways, a downward section where the media travels downward, and a third sideways section where the media travels sideways, wherein the first imager transfers the image to one of media and a web in the upward section of the first media print path and the first printer engine places markings on the media on the third sideways section of the first media print path, and the second imager transfers the image to one of media and a web in the upward section of the second media print path and the second printer engine places markings on the media on the second sideways section of the first media print path.

12. The image production section of claim 11, wherein the first media print path and the second media print path have separate inputs separate outputs.

13. The image production section of claim 11, further comprising:

a third media print path which produces duplex images on media, wherein the user interface receives a request to print a duplex print job, and the image production section prints the duplex print job on the third media print path.

14. The image production section of claim 13, wherein the third media print path contains portions of the first media print path and the second media print path.

15. The image production section of claim 11, wherein the image production device is one of a copier, a printer, a facsimile device, and a multi-function device.

* * * * *